(12) United States Patent
Mahmoud

(10) Patent No.: US 6,425,079 B1
(45) Date of Patent: Jul. 23, 2002

(54) UNIVERSAL OPTION ROM BIOS INCLUDING MULTIPLE OPTION BIOS IMAGES FOR MULTICHIP SUPPORT AND BOOT SEQUENCE FOR USE THEREWITH

(75) Inventor: Fadi A. Mahmoud, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/282,919

(22) Filed: Mar. 31, 1999

(51) Int. Cl.[7] .................. G06F 9/445; G06F 15/177
(52) U.S. Cl. .............................. 713/2; 710/62
(58) Field of Search .................. 713/1, 2, 100; 710/1, 62–64; 714/23; 712/1, 2, 100

(56) References Cited

U.S. PATENT DOCUMENTS

| | | | |
|---|---|---|---|
| 5,797,023 A | * 8/1998 | Berman et al. | 713/324 |
| 5,836,013 A | * 11/1998 | Greene et al. | 713/2 |
| 5,933,652 A | * 8/1999 | Chen et al. | 710/1 |
| 6,167,532 A | * 12/2000 | Wisecup | 714/23 |

* cited by examiner

Primary Examiner—Thomas Lee
Assistant Examiner—Thuan Du
(74) Attorney, Agent, or Firm—Martine & Penilla, LLP

(57) ABSTRACT

A boot sequence adapted for use with a computer system during execution of system BIOS to ensure compatibility between an option ROM BIOS chip and a chip of interest with which the option ROM BIOS chip is intended to communicate during operation of the computer system is provided. The boot sequence may broadly include the operations of initially locating the chip of interest and then sequentially scanning each of option ROM BIOS chip's images until a determination is made that a match exists between the unique PCI device ID associated with the chip of interest and the image PCI device ID associated with a scanned one of the BIOS images. The boot sequence then ensures that the first BIOS image incorporates the unique PCI device ID associated with the chip of interest, after which the first BIOS image is loaded into system RAM for execution of the BIOS routine. A universal ROM BIOS chip for use in implementing the boot sequence of the present invention, as well as an adapter card having such a universal ROM BIOS chip, are also provided.

18 Claims, 6 Drawing Sheets

UNIVERSAL OPTION ROM BIOS INCLUDING MULTIPLE OPTION BIOS IMAGES FOR MULTICHIP SUPPORT AND BOOT SEQUENCE FOR USE THEREWITH

BACKGROUND OF THE INVENTION

1. Field of the Invention

This invention relates generally to the field of computing technology and more particularly concerns the initialization routine, or boot sequence, of a computer system which prepares the system for loading an operating system.

2. Description of the Related Art

During a computer system's initialization routine, commonly referred to as a boot sequence, a variety of diagnostics are performed by the computer system to ascertain the availability and status of hardware devices and ensure proper operation of components. During initialization, a program counter informs the central processing unit (CPU) of the address of the next instruction needed for processing. Here the address is the beginning of a boot program permanently stored in a set of ROM chips that comprise part of the system BIOS and contain the computer's basic input/output system (BIOS).

Upon execution of system BIOS, the boot program invokes a series of system checks to ascertain the location, number and identity of various devices associated with the computer system. To accomplish this, the CPU transmits signals over buses to the motherboard's various expansion slots to ensure their associated adapter cards are functioning properly. While the predominant type of expansion slot employed today utilizes either the peripheral component interconnect (PCI) or the newer accelerated graphics port (AGP), other types of buses including video electronics standards association local bus (VL-BUS), industry standard architecture (ISA) and extended industry standard architecture (EISA) are also employed to a lesser extent. Residing within the respective expansion slots may be a variety of adapter cards which may include, by way of example only, a network adapter card, a SCSI card or other similar device.

Also associated with these adapters, such as adapter card 80 in prior art FIG. 1, is a firmware code known as the option ROM BIOS. The adapter's option ROM BIOS chip 70 includes an associated BIOS image 72 which is in part characterized by a specific PCI device ID 74 located in the BIOS image's PCI header structure 76. This PCI device ID 74 is intended to match the unique identification of the PCI device chip 90 on the adapter card 80 with which option ROM BIOS chip 70 communicates. During the initialization routine, it is necessary to incorporate each adapter's option ROM BIOS into the system RAM as part of the computer system's overall BIOS and memory configuration. To this end, the system BIOS 22 residing on the motherboard 40 communicates, via the PCI bus 26, with the adapter's option ROM BIOS chip 70 to determine if a PCI device ID match exists between it and the associated PCI device chip 90. If a match does not exist, then system BIOS 22 will not permit execution of the option ROM BIOS—i.e. it will ignore it and not load it into the system's overall BIOS and memory configuration.

In the past, the BIOS image associated with each option ROM BIOS chip only stores one PCI device ID in the PCI header Structure. However, as more and more PCI device chips are released by manufacturers, each chip requires a unique PCI device ID and, thus, its own BIOS image in the associated option ROM BIOS chip. Thus, it becomes necessary to keep track of these different BIOS images because, unless a match exists between the PCI device ID and the associated PCI device chip, no communication can take place with the option ROM BIOS chip. The importance and difficulty of keeping track of these different BIOS images is further complicated by the fact that there exists different families of adapters, each with different versions of PCI device chips. These families include, for example, SCSI controllers, RAID controllers, processors and bridges.

While the proliferation of these PCI device chips is primarily a problem for the manufacture and its tech support, the user might also encounter a compatibility problem from time to time. For example, if it is determined that a compatibility does not exist between the PCI device chip and its associated PCI device ID residing on the adapter card's option ROM BIOS chip, then the user might attempt to rectify the problem by using a flash utility program whereby the user flashes a new BIOS image onto the option ROM BIOS chip. This option is available today given that newer computer systems store the BIOS on flash ROMs, namely EEPROMs, which can be erased and rewritten if the user needs to update the BIOS program. However, in the event the user inadvertently flashes the wrong BIOS image, this results in a tech support issue for the manufacturer in order to rectify the problem. This of course increases the cost of the product for the manufacturer.

As illustrated in prior art FIG. 2, the user might also encounter this compatibility problem where the PCI device chip of interest 90' resides on the computer system's motherboard 40', as opposed to its adapter card 80'. For example, the ARO-1130 controller manufactured by Adaptec, Inc. of Milpitas, Calif., is a RAID adapter card that does not have a SCSI chip physically residing on the card. Instead, the ARO-1130 plugs into a specific motherboard provided with the appropriate SCSI chip. The option ROM BIOS chip 70', though, does reside on the ARO adapter card and becomes physically connected to the SCSI chip through the PCI bus. Provided the user employs the appropriate motherboard, there is no compatibility problem between the SCSI chip on the motherboard and its associated PCI device ID residing in the BIOS image of the adapter card's option ROM Bios chip. However, were the user to employ a different motherboard having a different SCSI chip, and therefore a different PCI device ID, then the problem arises. Again, this problem generates a tech support call because the user must update the option ROM BIOS on the adapter card which is typically accomplished by downloading a flash utility from the manufacturer capable of detecting the SCSI chip on the motherboard and flashing its corresponding BIOS.

In view of the foregoing, what is needed is a new and improved approach for optimizing the versatility of option ROM BIOS chips to accommodate different families of PCI device chips irrespective of the number of different versions of PCI device chips within each family. Such a solution would benefit the manufacturing side of operations through cost savings, time savings, etc., and also benefit the research and development side by avoiding confusion in the compatibility testing process. The appropriate solution would also benefit the user who would no longer even encounter such a compatibility problem.

SUMMARY OF THE INVENTION

The present invention fills these needs by providing a new and useful boot sequence adapted for use with a computer system during execution of the system BIOS to ensure compatibility between an option ROM BIOS chip and a chip of interest with which the option ROM BIOS chip is intended to communicate during the initial operation of the computer system. Here, the chip of interest may be one of a family of related PCI device chips (e.g., SCSI chips) each characterized by a unique PCI device ID, while the option ROM BIOS chip has a BIOS routine common to the family of chips and includes a plurality of BIOS images, each containing an image PCI device ID corresponding to the unique PCI device ID of an associated one of the chips in the family.

In a first exemplary embodiment of the present invention, there is a first one of the BIOS images which incorporates the common BIOS routine and at least one truncated BIOS image which does not. According to the boot sequence, the chip of interest is initially located. The operation of locating the chip interest includes the steps of initially finding a PCI device chip having an associated option ROM BIOS chip and then determining if the option ROM BIOS chip includes multiple BIOS images. Thereafter, the BIOS images are sequentially scanned until a determination is made that a match exists between the unique PCI device ID associated with the chip of interest and the image PCI device ID associated with a scanned one of the BIOS images. When such a determination is made, a matched image is identified. The boot sequence then insures that the first BIOS image incorporates the unique PCI device ID associated with the chip of interest. Once accomplished, the first BIOS image is loaded into system RAM and the BIOS routine is executed.

In the absence of a match between the unique PCI device ID of the chip of interest and the image PCI device ID of the first BIOS image, the operation of insuring that the first BIOS image incorporates the unique PCI device ID is accomplished by replacing the image PCI device ID of the first BIOS image with the unique PCI device ID of the chip of interest. Preferably, each truncated BIOS image includes a Chip ID Check (CIC) sub-routine so that this operation of replacement is accomplished by loading and executing the CIC sub-routine associated with the matched image. This CIC sub-routine may incorporate the operation steps of reading the image PCI device ID of the first BIOS image, flashing the PCI device ID of the first BIOS image into the PCI header structure of the matched image, and thereafter writing the PCI device ID of the matched image into the PCI header structure of the first BIOS image. Preferably the checksum of the images is recalculated and then flashed. Once the PCI device ID of the first BIOS image is replaced with the unique PCI device ID of the chip of interest, system BIOS can be restarted.

In a second exemplary embodiment of the present invention, each of the BIOS images is a complete image corresponding to a selected one of the chips in the family so that each BIOS image includes a BIOS routine and the unique chip identifier associated with a selected one of these chips. Here, the boot sequence comprises the steps of sequentially scanning each of the BIOS images to determine the existence of a match and thereafter loading into system RAM for execution a complete BIOS image corresponding to the chip of interest. Here again, it is preferred that the chip interest is a PCI device chip with its unique chip identification in the form of a PCI device ID and that the image identification associated with each BIOS image is also in the form of a PCI device ID. It should be appreciated by the ordinarily skilled artisan, however, that the boot sequence described herein can be employed with other types of chips of interest not limited specifically to PCI device chips, provided the appropriate devices in the computer system can be manufactured or modified to incorporate the boot sequence of the present invention.

In a third exemplary embodiment of the present invention a flash utility program is provided which contains a plurality of identifying information which can be permanently imbedded into a chip's BIOS image. The flash utility program would identify a chip of interest located on an adapter card and change specific bytes which form part of the chip's BIOS image in order to update the BIOS image and render the option ROM BIOS chip compatible with the chip of interest. To this end, the flash utility program would necessarily include certain identifying information relating to each PCI device chip in a given family of related chips.

Various hardware devices are also contemplated for use in implementing the boot sequences of the present invention. One such hardware device is in the form of a universal ROM BIOS chip that is compatible with a family of related chips and capable of communicating with a chip interest within the family during computer system operation. Here, each related chip is characterized by a unique chip identification and a common BIOS routine. The universal ROM BIOS chip may be constructed to permit implementation of the first exemplary embodiment of the boot sequence of the present invention so that it comprises a plurality of BIOS images, with a first BIOS image including the common BIOS routine and an image identification corresponding to the unique chip identification associated with a selected one of the chips in the family. The universal ROM BIOS chip also comprises a plurality of truncated BIOS images each including a respective image identification which corresponds to the unique chip identification associated with another of the chips within the family. Upon execution of system BIOS, the BIOS images can be sequentially scanned until a determination is made that a match exists between the unique chip identification associated with the chip of interest and the image identification associated with a scanned one of the BIOS images. The universal ROM BIOS chip is preferably in the form of a flash ROM integrated circuit device, such as an electronically erasable programmable read only memory (EEPROM) chip, so that, if necessary, the first BIOS image can be modified to incorporate the unique chip identification of the chip of interest to permit the system BIOS to execute the common BIOS routine.

Alternatively, the universal ROM BIOS chip could be constructed to permit implementation of the boot sequence according to the second exemplary embodiment of the present invention so that it is capable of communicating with a single-function chip of interest. Here, the universal ROM BIOS chip comprises a plurality of complete BIOS images each including the common BIOS routine and an image PCI device ID corresponding to the unique PCI device ID associated with a selected one of the PCI device chips in the family. As such, when the boot sequence determines that a match exists, the BIOS routine associated with a matched one of the BIOS images can simply be executed.

The present invention also contemplates an adapter card for use with a computer system. This adapter card broadly comprises a printed circuit board adapted to interconnect to an expansion slot on the computer system's motherboard and a universal ROM BIOS chip which may be constructed in accordance with any one of the manners discussed above.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein.

DETAILED DESCRIPTION OF THE PREFERRED EMBODIMENTS

The boot sequence of the present invention is adapted for use with a computer system during execution of the system BIOS to ensure compatibility between an option ROM BIOS chip which includes a BIOS routine and a chip of interest with which the option ROM BIOS chip is intended to communicate during initiation of the system operation. For purposes of the disclosure herein, the computer system preferably includes a read only memory (ROM) with a boot program stored therein, an addressable system random access memory (system RAM) and a selected number of controllers or adapters, each of which resides in a respective expansion slot on the computer system's motherboard. Associated with each of the controllers is a chip of interest that is one of a family of related chips, each characterized by a unique chip identification, and an option ROM BIOS chip that includes a plurality of BIOS images each containing an image identification corresponding to the unique chip identification of an associated one of the chips in the family. While the exemplary embodiments of the invention are described herein with reference to a PCI device chip characterized by a unique PCI device ID, it should be appreciated by the ordinarily skilled artisan that the boot sequence of the present invention should not be unnecessarily confined in its application to PCI device chips.

Figure 3:
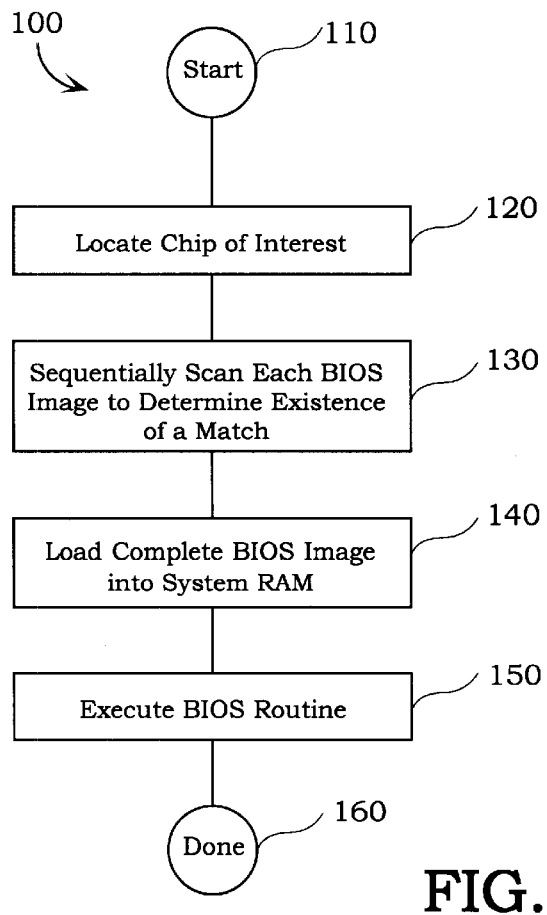
FIG. 3 is a schematic flow chart depicting the principal concepts of the boot sequence methodology according to the first and second exemplary embodiments of the present invention.

With initial reference then to FIG. 3, it may seen that a flow chart is provided to explain the broad implementation of the boot sequence according to the first and second exemplary embodiments of the present invention. Here, the boot sequence 100 begins at start 110 and the location, at 120, of a chip of interest with which the adapter's option ROM BIOS chip is intended to communicate during computer system operation. At 130 the boot sequence initially scans each of the BIOS images to determine the existence of a match between the unique PCI device ID associated with the chip of interest and the image PCI device ID associated with a scanned one of the BIOS images. In each of the first and second exemplary embodiments, a complete BIOS image corresponding to the chip of interest is loaded into system RAM at 140, with this complete BIOS image characterized by the unique chip identification associated with the chip of interest and the BIOS routine. Thereafter, at step 150 the BIOS routine is executed and the boot sequence is completed at step 160.

Figure 1:
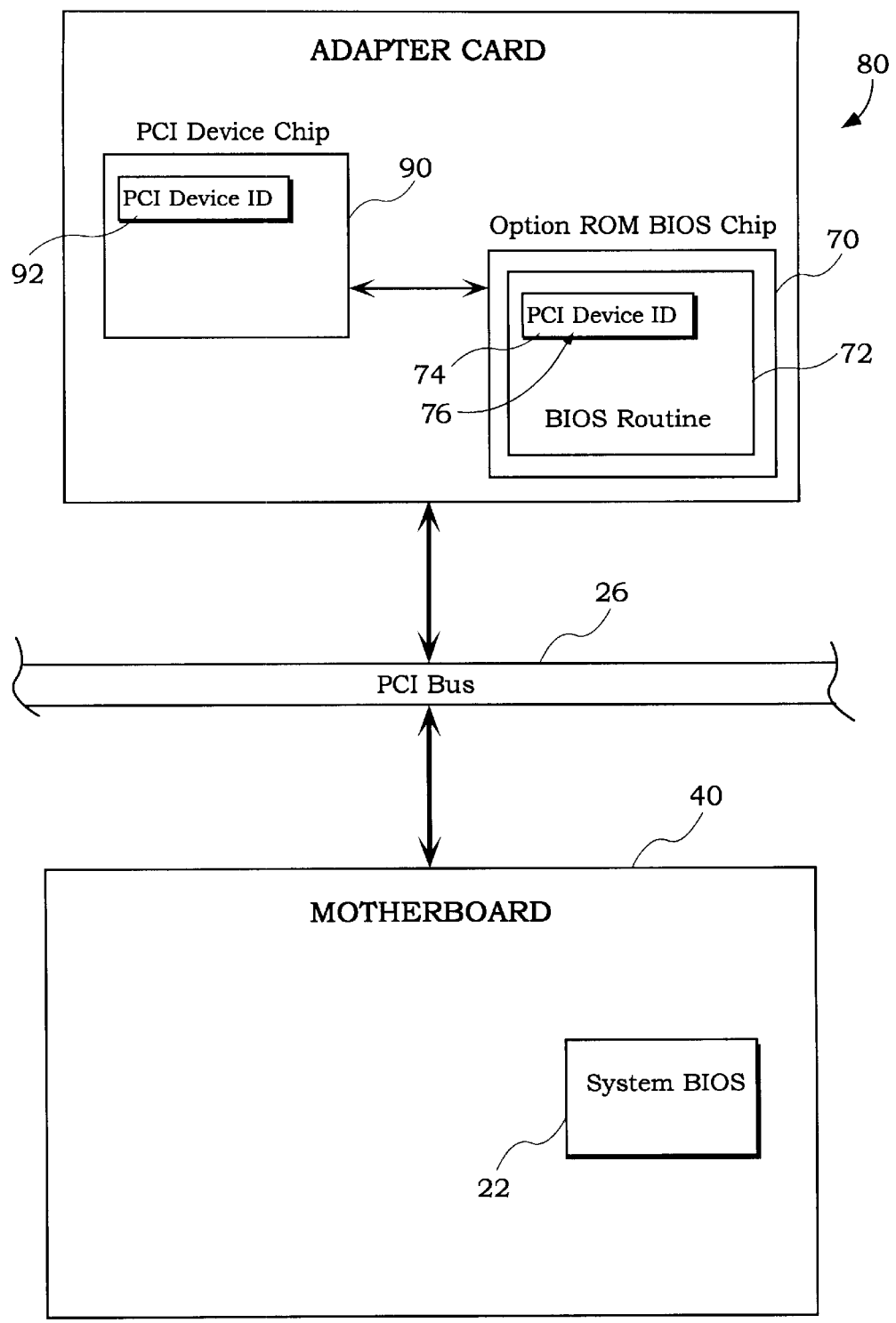
FIG. 1 is a block diagram of a portion of a computer system constructed according to the prior art and showing an adapter card interconnected to the computer system's motherboard via a PCI bus.
Figure 2:
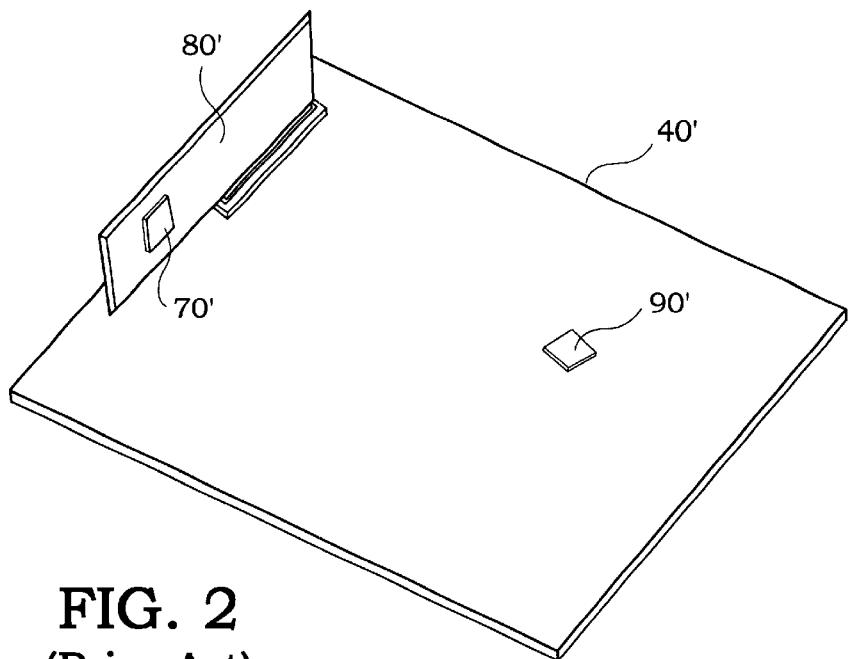
FIG. 2 is a perspective view illustrating an adapter card received in a motherboard's expansion slot, and specifically showing the PCI device chip associated with the adapter card residing on the motherboard, as known in the prior art.
Figure 4A:
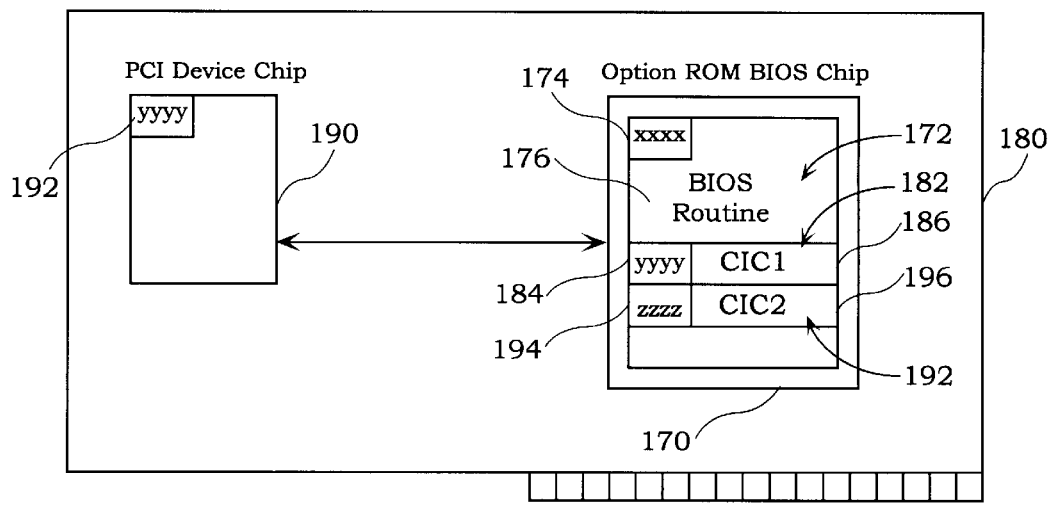
FIG. 4(a) is a block diagram of a representative adapter card having an option ROM BIOS chip for use with the boot sequence according to the first exemplary embodiment of the present invention.
Figure 4B:
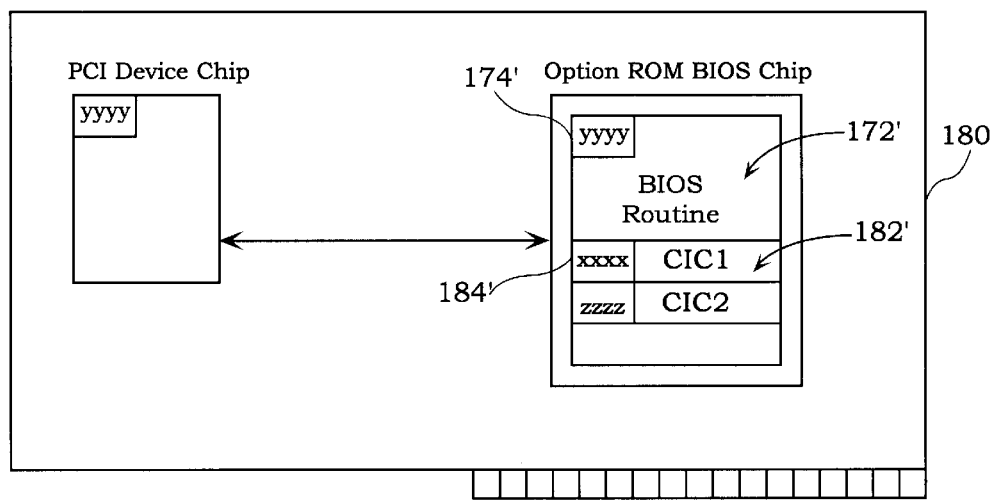
FIG. 4(b) is a block diagram of the adapter card shown in FIG. 4(a), and specifically illustrating the adapter card's option ROM BIOS chip as it would appear after completion of the boot sequence of the first exemplary embodiment of the present invention.

The boot sequence according to the first exemplary embodiment of the present invention will now be explained with reference to FIGS. 4(a), 4(b) and 5. With initial reference to FIG. 4(a), the boot sequence according to the first exemplary embodiment of the present invention is appropriate for use with an adapter card 180 having an associated PCI device chip 190 and an option ROM BIOS chip 170 with which chip 190 communicates during initial system operation. While FIG. 4(a) illustrates a PCI device chip which physically resides on adapter card 180, it should be appreciated by the ordinarily skilled artisan that the boot sequence of the present invention can also be employed where chip 190 resides on the computer system's motherboard, as was discussed above with reference to prior art FIG. 2. In any event, option ROM BIOS chip 170 is provided with a plurality of BIOS images 172, 182 and 192. FIG. 4(a) only depicts three such BIOS images for illustrative purposes only. However, there could be any number of BIOS images provided on option ROM BIOS chip 170 provided there is enough memory to accommodate these BIOS images, with the selected number of BIOS images preferably corresponding to the number of related chips within a family.

First BIOS image 172 is a complete BIOS image, while BIOS images 182 and 192 are truncated images. Each of the BIOS images 172, 182 and 192 contains an image PCI device ID 174, 184 and 194, respectively, which corresponds to the unique PCI device ID of an associated one of the chips in the family. For example, first BIOS image 172 representatively includes the image PCI device ID "xxxx", while second BIOS image 182 representatively includes the image PCI device ID "yyyy" and third BIOS image 192 representatively includes the image PCI device ID "zzzz". As a complete image, first BIOS image 172 additionally incorporates the BIOS routine 176 common to each of the chips within the family. Truncated BIOS images 182 and 192 do not incorporate the common BIOS routine 176 but instead incorporate their own Chip ID Check sub-routine 186 and 196, respectively, so that second BIOS image 182 includes sub-routine "CIC1" and third BIOS image 192 includes sub-routine "CIC2". As also shown in FIG. 4(a), PCI device chip 190 is identified by the unique PCI device ID 192, representatively denoted "yyyy" which corresponds to the image PCI device ID 184 of second BIOS image 182. In order to accommodate a plurality of BIOS images it is necessary that option ROM BIOS chip 170 have a larger memory capacity than existing option ROM BIOS chips which only require 64K of memory to accommodate a single PCI device ID and a BIOS routine. Complete BIOS image 172 and truncated BIOS images 182 and 192 could, therefore, be easily configured on an option ROM BIOS chip 170 having a capacity of 128K.

Figure 5:
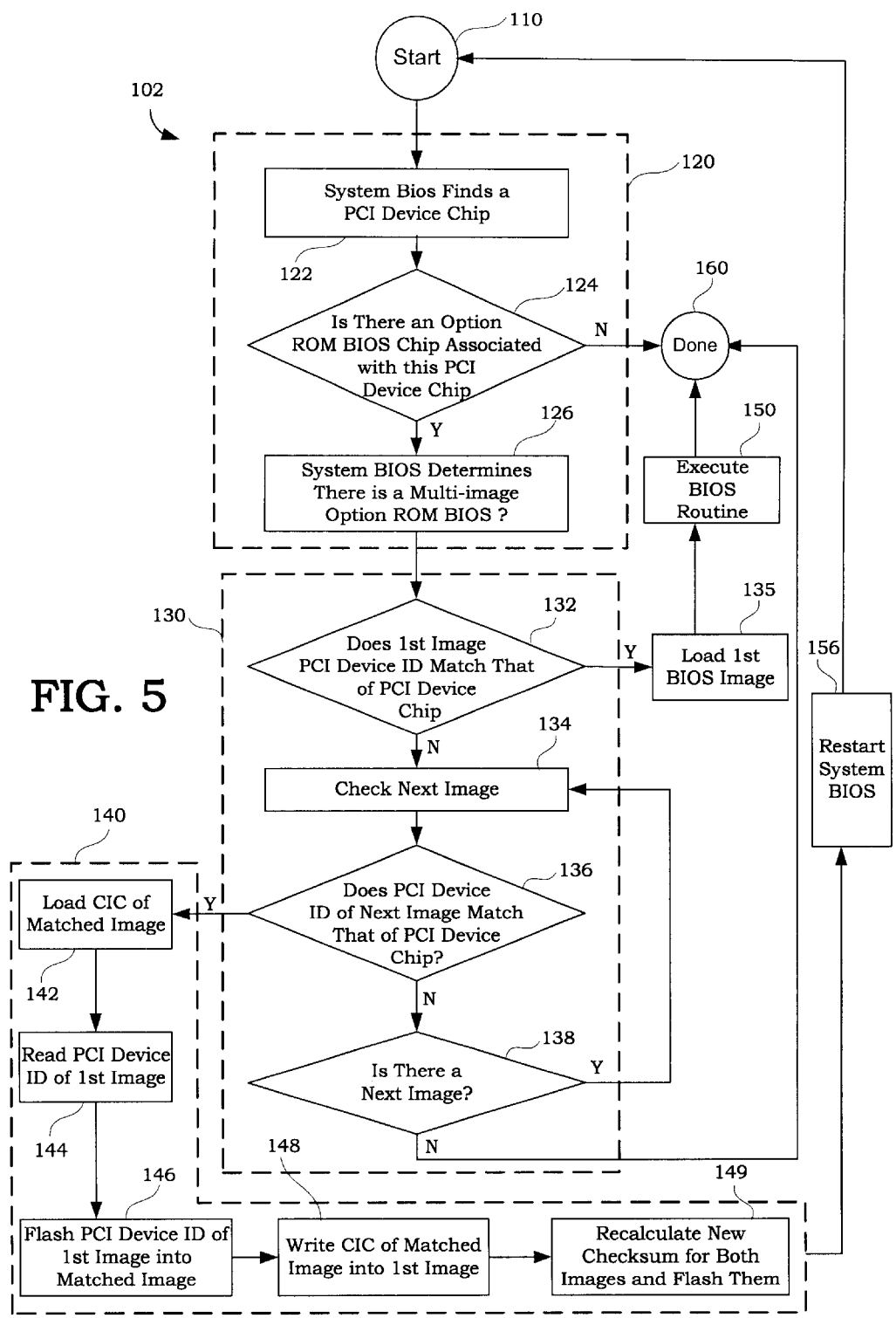
FIG. 5 is a schematic flow chart depicting the more detailed concepts of the boot sequence methodology according to the first exemplary embodiment of the present invention.

With an appreciation of the construction of the option ROM BIOS chip 170 for use with the boot sequence according to the first exemplary embodiment of the present invention, the more detailed steps involved in the boot sequence 102 may now be better appreciated with reference to FIG. 5. Following start 110, the operation at 120 in FIG. 3 of locating the chip of interest is accomplished by the system BIOS initially finding a PCI device chip at 122 and thereafter inquiring at 124 whether there is an option ROM BIOS chip associated with this PCI device chip. In the event the answer to this inquiry is a logic "no," then boot sequence 102 is completed at 160. However, where this inquiry returns a logic "yes," then system BIOS determines at 126 that there is a multi-image option ROM BIOS associated with the PCI device chip (i.e. the chip of interest).

At this point, system BIOS performs the operation 130 of sequentially scanning each of the BIOS images until a determination is made that a match exists between the unique PCI device ID associated with the chip of interest and the image PCI device ID associated with a scanned one of the BIOS images, thereby to identify a matched image. This operation initially includes the step at 132 of determining if the first image PCI device ID matches the unique PCI device ID associated with the chip of interest. With reference again to FIG. 4(a), then, system BIOS compares the image PCI device ID "xxxx" located in the PCI header structure of first BIOS image 172 with the unique PCI device ID "yyyy" associated with PCI device chip 190. In this case, system BIOS determines that a match does not exist and therefore a logic "no" is returned in response to the inquiry at step 132.

At this point, the next image is checked at 133 and a determination is again made at 136 whether the PCI device ID of the next image matches the unique PCI device ID of the chip. If the answer to this inquiry is a logic "no," then system BIOS determines at step 138 whether there is a next BIOS image. If "yes," then system BIOS returns to steps 134 and 136 to determine the existence of a match. If there are there are no additional BIOS images to check, then a logic "no" is returned in response to inquiry 138 and the boot sequence is terminated at 160.

However, continuing with the example option ROM BIOS chip 170 illustrated in FIG. 4(a), the response to the initial inquiry at 136 is now a logic "yes" so that system BIOS proceeds to operation 140 to ensure that the first BIOS image incorporates the unique PCI device ID associated with the chip of interest. Here, this operation 140 is accomplished by loading and executing the CIC sub-routine of the matched image, thereby to replace the image PCI device ID of the first BIOS image with the unique PCI device ID of the chip of interest. More particularly, system BIOS loads the CIC associated with the matched image at 142 and then reads the PCI device ID of the first image at 144. Thereafter, at step 146, the PCI device ID of the first image is flashed into the PCI header structure of the matched image. At step 148, the operation of writing the PCI device ID of the matched image into the PCI device header structure of the first image is performed. Now, in operation 149, the method proceeds to recalculate the checksum of both images and then flash both new checksums.

Continuing with the example, and with reference again to FIG. 4(a), the system BIOS would load CIC1 associated with second BIOS image 182, read image PCI device ID "xxxx" associated with first BIOS image 172, flash image PCI device ID "xxxx" into the PCI device header structure of truncated BIOS image 182, and then write image PCI device ID "yyyy" into the PCI device header structure of first BIOS image 172. It should be appreciated, then, that upon completion of the operation 140 of ensuring that the first BIOS image incorporates the unique PCI device ID associated with the chip of interest, option ROM BIOS chip 170 will now appear as illustrated in FIG. 4(b), wherein the image PCI device ID 174' of first BIOS image 172' is denoted by "yyyy" and the image PCI device ID 184' of truncated BIOS image 182' is denoted by "xxxx".

With reference again to FIG. 5, once operation 140 has been completed, the system BIOS is restarted at 156 and the entire boot sequence 102 begins again at 110. This time through, however, inquiry 132 returns a logic "yes" denoting that the first image PCI device ID matches that of the PCI device chip of the chip of interest. Now, system BIOS proceeds to step 135 where the first BIOS image is loaded into system RAM, after which the BIOS routine is executed at step 150 and the boot sequence is completed at step 160.

Figure 6:
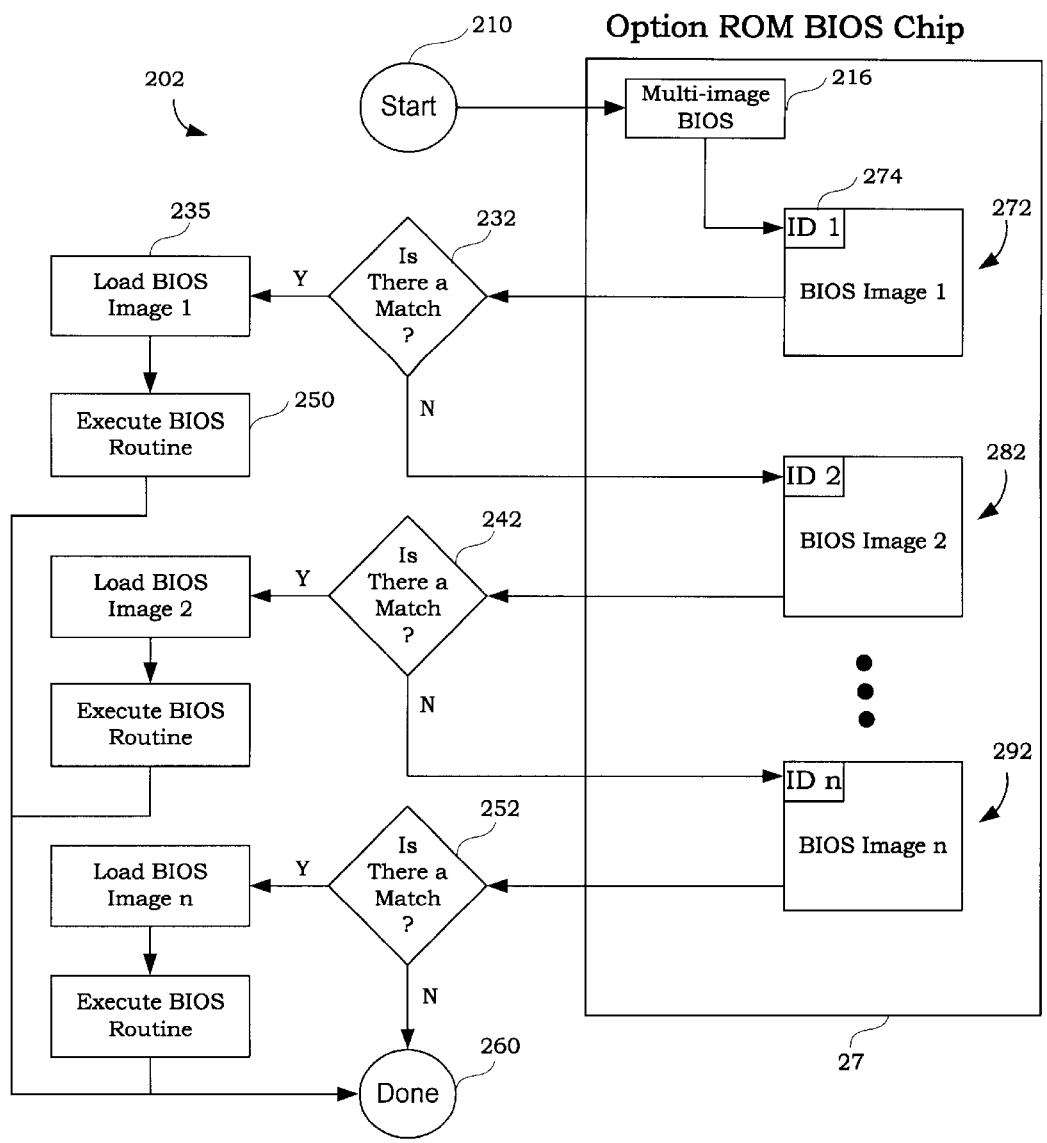
FIG. 6 is a schematic flow chart depicting the more detailed concepts of the boot sequence according to the second exemplary embodiment of the present invention, as used with an option ROM BIOS chip provided with a plurality of complete BIOS images.
Figure 7:
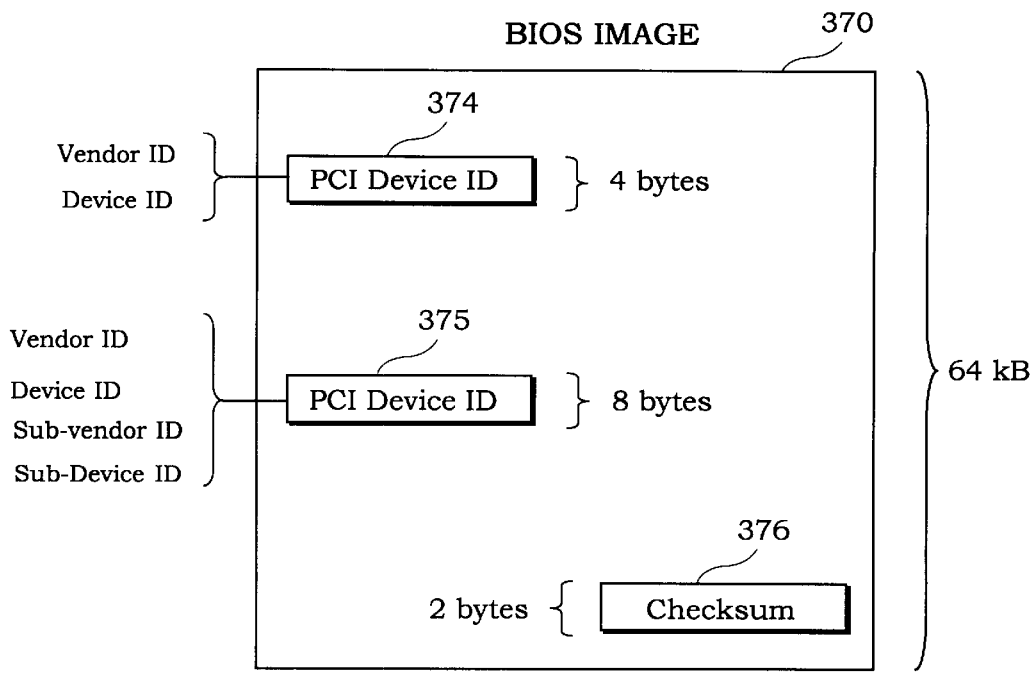
FIG. 7 is a block diagram illustrating the portions of a BIOS image which can be updated in accordance with a flash utility program according to the third exemplary embodiment of the present invention.

A second exemplary embodiment of the boot sequence may now be appreciated with reference to FIG. 6. Here, the boot sequence 202 also broadly follows the methodology steps illustrated in FIG. 3, but is particularly adapted for use with an option ROM BIOS chip, such as chip 270, which includes a plurality of complete BIOS images 272, 282 and 292. Again, it should be appreciated that the number of complete BIOS images is preferably dictated by the number of related PCI device chips within a given family. Once a determination is made at 216 that option ROM BIOS chip 270 includes multiple BIOS images, the system BIOS is directed to the image PCI device ID 274 associated with BIOS image1 and determines at 232 whether the representative identification "ID1" matches the unique PCI device ID associated with the chip of interest. If this inquiry returns a logic "yes", then BIOS image1 is loaded at 235 and executed 250, after which boot sequence 202 is completed at 260.

However, in the event a logic "no" is returned in response to the inquiry at 232, then system BIOS is directed to "ID2" associated with BIOS image2 and now inquires at step 242 whether "ID2" matches the unique PCI device ID associated with the chip of interest. It should be appreciated that system BIOS will continue to scan each of the complete BIOS images 272, 282 and 292 until a determination is made whether the image PCI device ID is associated with each of these complete BIOS images matches the unique PCI device ID associated with the chip of interest. Assuming one of the complete BIOS images does contain an image PCI device ID which matches that of the chip of interest, then ultimately the matched BIOS image will be loaded and executed. If, however, in the unlikely event that system BIOS scans each of the complete BIOS images and determines at step 252 that image identification IDn associated with BIOS image n does not match the unique PCI device ID of the chip of interest, then the boot sequence 202 will be complete at 260 (i.e. there will be no BIOS image loaded and executed).

Figure 8:
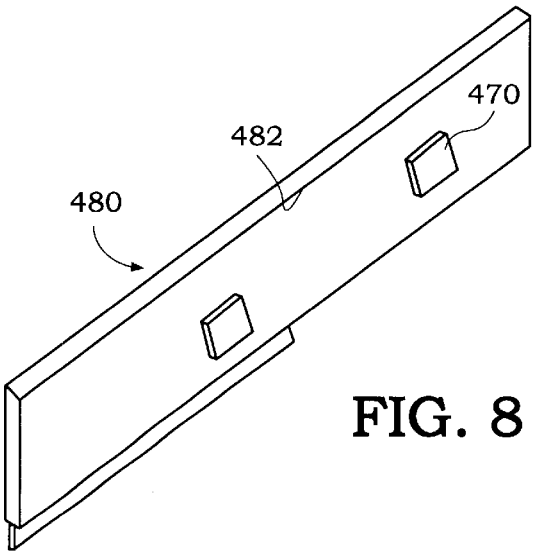
FIG. 8 is a perspective view representing an adapter card, and its associated option ROM BIOS chip, each of which may be constructed according the various exemplary embodiments of the boot sequence of the present invention.

A third exemplary embodiment of the present invention is generally depicted in FIG. 8. The third embodiment contemplates the use of a flash utility program contained on a floppy disk, with this flash utility program containing a plurality of identifying information which can be permanently imbedded into a chip's BIOS image, such as BIOS image 370 shown in FIG. 8. Such a flash utility program would identify a chip of interest located on an adapter card and change specific bytes which form part of the chip's BIOS image in order to update the BIOS image and render the option ROM BIOS chip compatible with the chip of interest. To this end, the flash utility program would necessarily include certain identifying information relating to each PCI device chip in a given family of related chips.

For example, the flash utility program might update the PCI device ID located in the PCI header structure 374 with information pertaining to the appropriate vendor ID and device ID. The flash utility program could also update the PCI device ID 375 located in the middle portion of the BIOS image with additional information pertaining to the appropriate sub-vendor and sub-device ID. Finally, the flash utility program could also update the CheckSum 376 located towards the end of the BIOS image.

With an understanding of the boot sequences discussed above with reference to the first and second exemplary embodiments of the present invention, it should be readily appreciated that the present invention also contemplates a universal ROM BIOS chip compatible with a family of related chips and capable of communicating with a chip of interest within the family during the initial operation of a computer system, as well as an adapter card which incorporates such a universal option ROM BIOS chip. With reference then to FIG. 8, an adapter card 480 is shown which may be adapted for use with a computer system. Adapter card 480 comprises a printed circuit board 482 adapted to interconnect to an expansion slot associated with the computer system and an option ROM BIOS chip 470 disposed on the printed circuit board. Universal option ROM BIOS chip 470 is compatible with a family of related chips and capable of communicating with a chip of interest within the family during operation of the computer system. It should be appreciated that option ROM BIOS chip 470 could be constructed similarly to that discussed above with reference to FIGS. 4(a) and 4(b) so that it includes a first complete BIOS image and at least one truncated BIOS image. In order to accomplish the boot sequence 102 according to the first exemplary embodiment of the present invention, universal ROM BIOS chip 470 is preferably in the form of a flash ROM integrated circuit device, such as an electronically erasable programmable read only memory (EEPROM) chip, which allows it to be erased and rewritten in order to accomplish the methodology steps discussed hereinabove.

Alternatively, universal ROM BIOS chip 470 could include a plurality of complete BIOS images so that it is able to accommodate the boot sequence 202 discussed above with reference to the second exemplary embodiment of the present invention. Each of these complete BIOS images would necessarily include the common BIOS routine and an image identification corresponding to the unique chip identification associated with a selected one of the chips in a family.

Although the foregoing invention has been described in some detail for purposes of clarity and understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A boot sequence adapted for use with a computer system during execution of system BIOS to ensure compatibility between an option ROM BIOS chip which includes a BIOS routine and a chip of interest with which the option ROM BIOS chip is intended to communicate during operation of the computer system, said chip of interest being one of a family of related PCI device chips each characterized by a unique PCI device ID and said option ROM BIOS chip including a plurality of BIOS images each containing an image PCI device ID corresponding to the unique PCI device ID of an associated one of said chips in said family, there being only a first one of said BIOS images which incorporates said BIOS routine and at least one truncated BIOS image, said boot sequence comprising:

locating said chip of interest;

sequentially scanning each of said BIOS images until a determination is made that a match exists between the unique PCI device ID associated with said chip of interest and the image PCI device ID associated with a scanned one of said BIOS images, thereby to identify a matched image;

ensuring that the first BIOS image incorporates the unique PCI device ID associated with said chip of interest;

loading the first BIOS image into system RAM; and executing said BIOS routine.

2. A boot sequence according to claim 1 wherein the operation of locating said chip of interest includes the steps of finding a PCI device chip and determining if there is an option ROM chip associated with said PCI device chip.

3. A boot sequence according to claim 2 wherein the operation of locating said chip of interest further includes the step of determining if there is a multi-image option ROM chip associated with said PCI device chip.

4. A boot sequence according to claim 1 wherein, in the absence of a match between the unique PCI device ID of said chip of interest and the image PCI device ID of said first BIOS image, said operation of ensuring that the first BIOS image incorporates the unique PCI device ID associated with said chip of interest is accomplished by replacing the image PCI device ID of said first BIOS image with the unique PCI device ID of said chip of interest.

5. A boot sequence according to claim 4 wherein each said truncated BIOS image includes a Chip ID Check (CIC) sub-routine and wherein said operation of replacing the image PCI device ID of said first BIOS image with the unique PCI device ID of said chip of interest is accomplished by loading and executing the CIC sub-routine associated with said matched image.

6. A boot sequence according to claim 5 wherein the CIC sub-routine of said matched image includes the following operations:

reading the image PCI device ID of said first BIOS image;

flashing the PCI device ID of said first BIOS image into the CIC portion of said matched image; and writing the CIC portion of said matched image into the first BIOS image.

7. A boot sequence according to claim 5 including an operation of restarting system BIOS after replacing the image PCI device ID of said first BIOS image with the unique PCI device ID of said chip of interest.

8. A boot sequence according to claim 4 including an operation of restarting system BIOS after replacing the image PCI device ID of said first BIOS image with the unique PCI device ID of said chip of interest.

9. A boot sequence adapted for use with a computer system during execution of system BIOS to ensure compatibility between an option ROM BIOS chip that includes a BIOS routine and a chip of interest with which the option ROM BIOS chip is intended to communicate during operation of the computer system, wherein said chip of interest is one of a family of related chips each characterized by a unique chip identification and wherein said option ROM BIOS chip includes a plurality of BIOS images each containing an image identification corresponding to the unique chip identification of a selected one of said chips in said family, said boot sequence comprising:

locating said chip of interest sequentially scanning each of said BIOS images to determine the existence of a match between the unique chip identification and the image identification associated with a scanned one of said BIOS images;

loading into system RAM a complete BIOS image corresponding to said chip of interest, wherein said complete BIOS image is characterized by the unique chip identification associated with said chip of interest and said BIOS routine; and executing said BIOS routine.

10. A boot sequence according to claim 9 wherein each of the BIOS images is a complete BIOS image corresponding to a selected one of said chips in said family so that each of the BIOS images includes said BIOS routine and the unique chip identifier associated with a selected one of said chips.

11. A boot sequence according to claim 10 wherein said chip of interest is a PCI device chip with its unique chip identification in the form of a PCI device ID, and wherein the image identification associated with each of said BIOS images is in the form of a PCI device ID.

12. A boot sequence according to claim 9 wherein said chip of interest is a PCI device chip with its unique chip identification in the form of a PCI device ID, and wherein the image identification associated with each of said BIOS images is in the form of a PCI device ID.

13. A universal option ROM BIOS chip compatible with a family of related chips and capable of communicating with a chip of interest within said family during operation of a computer system, wherein each of said related chips is characterized by a unique chip identification and a common BIOS routine, said universal option ROM BIOS chip comprising:

a plurality of BIOS images, there being a first BIOS image which includes said BIOS routine and an image identification corresponding to the unique chip identification associated with a selected one of said chips within said family, and a plurality of truncated BIOS images each including a respective image identification which corresponds to the unique chip identification associated with another of said chips within said family, said universal ROM BIOS chip in the form of a flash ROM integrated circuit device such that, upon execution of system BIOS, said BIOS images can be sequentially scanned until a determination is made that a match exists between the unique chip identification associated with said chip of interest and the image identification associated with a scanned one of said BIOS images, and, if necessary, the first BIOS image can be modified to incorporate the unique chip identification of said chip of interest to permit the system BIOS to execute said common BIOS routine.

14. A universal option ROM BIOS chip according to claim 13 wherein said flash ROM is an electronically erasable programmable read only memory (EEPROM) chip.

15. A universal option ROM BIOS chip according to claim 13 wherein said unique chip identification and each said image identification is in the form of a PCI device ID.

16. A universal option ROM BIOS chip according to claim 15 wherein each of said truncated BIOS images includes an associated Chip ID) Check (CIC) sub-routine operative to replace the image PCI device ID of said first BIOS image with the unique PCI Device ID associated with said chip of interest.

17. A universal option ROM BIOS chip compatible with a family of related PCI device chips and capable of communicating with a single-function chip of interest within said family during operation of a computer system, wherein each of said related PCI device chips is characterized by a unique PCI device ID and a common BIOS routine, said universal ROM BIOS chip comprising a plurality of complete BIOS images each including said common BIOS routine and an image PCI device ID corresponding to the unique PCI device ID associated with a selected one of said PCI device chips in said family such that, upon execution of system BIOS, said BIOS images can be sequentially scanned until a determination is made that a match exists between the unique PCI device ID associated with said chip of interest and the image PCI device ID associated with a scanned one of said BIOS images, thereby to permit execution of the BIOS routine of a matched one of said BIOS images.

18. A controller card adapted for use with a computer system, comprising:

a printed circuit board adapted to interconnect to an expansion slot associated with said computer system; and a universal option ROM BIOS chip disposed on said printed circuit board, said option ROM BIOS chip compatible with a family of related PCI device chips and capable of communicating with a chip of interest within said family during operation of a computer system, wherein each of said related PCI device chips is characterized by a unique PCI device ID and a common BIOS routine, said option ROM BIOS chip comprising a plurality of BIOS images, there being a first BIOS image including said BIOS routine and an image PCI device ID which corresponds to the unique PCI device ID associated with a selected one of said chips within said family, and a plurality of truncated BIOS images each including a respective image PCI device ID which corresponds to the unique PCI device ID associated with another of said chips within said family, said option ROM BIOS chip in the form of an EEPROM integrated circuit device such that, upon execution of system BIOS, said BIOS images can be sequentially scanned until a determination is made that a match exists between the unique PCI device ID associated with said chip of interest and the image PCI device ID associated with a scanned one of said BIOS images, and, if necessary, the first BIOS image can be modified to incorporate the unique PCI device ID of said chip of interest to permit the system BIOS to execute said common BIOS routine.

* * * * *